(12) United States Patent
Uchida et al.

(10) Patent No.: US 7,338,679 B2
(45) Date of Patent: *Mar. 4, 2008

(54) GEL COMPOSITIONS AND UTILIZATION THEREOF

(75) Inventors: Kazuro Uchida, Toyonaka (JP); Iwao Asai, Toyonaka (JP)

(73) Assignee: San-Ei Gen F.F.I., Inc., Toyonaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/297,608

(22) PCT Filed: Jun. 14, 2001

(86) PCT No.: PCT/JP01/05083

§ 371 (c)(1),
(2), (4) Date: Dec. 13, 2002

(87) PCT Pub. No.: WO01/95742

PCT Pub. Date: Dec. 20, 2001

(65) Prior Publication Data

US 2003/0138544 A1 Jul. 24, 2003

(30) Foreign Application Priority Data

Jun. 14, 2000 (JP) .............................. 2000-178908
Nov. 15, 2000 (JP) .............................. 2000-348509

(51) Int. Cl.
*A23L 1/0524* (2006.01)
(52) U.S. Cl. ..................................................... 426/577
(58) Field of Classification Search ................ 426/573, 426/577
See application file for complete search history.

(56) References Cited

U.S. PATENT DOCUMENTS

| | | | | |
|---|---|---|---|---|
| 3,892,870 A | * | 7/1975 | Wood .......................... | 426/573 |
| 4,089,981 A | * | 5/1978 | Richardson .................. | 426/104 |
| 4,119,739 A | * | 10/1978 | Barwick et al. ............. | 426/573 |
| 5,562,939 A | * | 10/1996 | Lewis .......................... | 426/250 |
| 5,576,039 A | * | 11/1996 | Lewis .......................... | 426/250 |
| 6,485,771 B1 | * | 11/2002 | Somerville et al. .......... | 426/573 |

FOREIGN PATENT DOCUMENTS

| EP | 0 487 340 A1 | 5/1992 |
|---|---|---|
| EP | 0 656 176 A1 | 6/1995 |
| EP | 656176 A1 * | 6/1995 |
| EP | 0752211 A1 | 1/1997 |
| JP | 03-277259 | 12/1991 |
| JP | 07-196707 | 8/1995 |
| JP | 08-256705 | 10/1996 |
| RU | 504534 | 5/1976 |

OTHER PUBLICATIONS

Wiley-Encyclopedia of Food Science and Technology (2nd Edition) vol. 1-4, Copyright 1999. John Wiley & Sons . pp. 1224 and 1271. Retrieved from ONLINE Knovel database Oct. 25, 2004. URL<http://www.knovel.com/knovel2/Toc.jsp?SpaceID=155&BookID=681>.*
Jackson Gastroenterology. "Dysphagia Diet 5 Levels Difficulty in Swallowing Diet". Copyright 1998, pp. 12-12. Retrieved from Internet Oct. 25, 2004. URL<http://web.archive.org/web/20000824035602/http://www.gicare.com/pated/edtgs07.htm>.*
Handbook of Hydrocolloids. Copyright 2000,Woodhead Publishing, pp. 87-102. Retrieved from online Knovel database Oct. 25, 2004. URL<http://www.knovel.com/knovel2/Toc.jsp?BookID=168>.*
Amazon.com sale ad for Handbook of Hydrocolloids. Retrieved from Internet Oct. 26, 2004. URL<http://www.amazon.com/exec/obidos/tg/detail/-/084930850X/102-4762363-6736945?v=glance>.*
Value Recipes sale ad for Handbook of Hydrocolloids. Retrieved from Internet Oct. 26, 2004. URL<http://www.valuerecipes.com/index.php/trade/productinfo/ASIN/084930850X>.*
U.S. Appl. No. 10/322,574, filed Dec. 19, 2002 for Composition for Preparing Imitation Fruit Flesh and Food Containing the Same.
International Search Report dated Sep. 25, 2001.

* cited by examiner

*Primary Examiner*—Arthur L. Corbin
(74) *Attorney, Agent, or Firm*—Kratz, Quintos & Hanson, LLP

(57) ABSTRACT

Novel gel compositions having a sarcocarp-like texture and taste (mouth feelings): and foods having a sarcocarp-like texture with the use the same. These novel gel compositions comprise pectin, a divalent metal ion and water optionally together with negatively charged gelling agent. The above-described pectin contains at least one member selected from among pectinic acid and its salts and forms heat-stable particles having a diameter of at least 100 μm in the presence of water, or particles having an average diameter of 10 to 5000 μm in the presence of water and calcium ion.

15 Claims, No Drawings

GEL COMPOSITIONS AND UTILIZATION THEREOF

TECHNICAL FIELD

This invention relates to a novel gel composition that has a sarcocarp-like texture. The present invention also relates to a food in which the above-mentioned novel gel composition is utilized, and more particularly to an imitation sarcocarp food that has a sarcocarp-like texture and/or a sarcocarp-like taste (mouth feelings) resulting from the utilization of the above-mentioned gel composition.

BACKGROUND ART

Jelly foods have the soft and elastic texture characteristic of gels, and feel smooth to the tongue, and as such are widely used in desserts. Numerous jelly foods, which are prepared using substances capable of forming a gel such as agar and gelatin, have come onto the market in the past. Among of these jelly foods, demand has been rising steadily for those that simulate sarcocarp because these products offer the same taste and texture as fruit more easily and inexpensively.

Thus, jelly foods have met with wide acceptance as desserts among consumers, and are being used in ever-increasing quantities, but most jelly foods are produced merely by dissolving a gelling agent and then gelling the resultant solution by cooling or some other treatment, and seasoning the product with an aroma and flavor that imitate those of real fruit, but have a texture and taste (mouth feelings) that are different from those of actual sarcocarp.

Accordingly, there have been many attempts at making the texture of jelly foods more closely approximate the texture of sarcocarp.

DISCLOSURE OF THE INVENTION

It is an object of the present invention to provide a novel gel composition, and more particularly a novel gel composition that has a sarcocarp-like texture and/or taste (mouth feelings).

It is a further object of the present invention to provide a food, and more particularly a dessert food, whose texture and/or taste (mouth feelings) is just like that of a real fruit sarcocarp, thereby giving greater variety to the types and functions of foods.

As a result of diligent research aimed at achieving the above objects, the inventors discovered that if a special kind of pectin that does not dissolve in water is mixed with a divalent metal ion in the presence of water, it will locally agglomerate and gel, forming a grainy, inhomogeneous phase in the water, and the texture of the result agglomerated gel (hereinafter also referred to as "pectin-formed agglomerated gel") will be similar to the texture of fruit or fruit fiber, and that the agglomerated gel can be adjusted to the desired elasticity by suitably adjusting the concentrations of the pectin and divalent metal ion.

Further research was conducted on the basis of this finding, which confirmed that if a negatively charged gelling agent is used in addition to the above components, a reaction between the gelling agent and the divalent metal ion will result in forming a gel structure phase (hereinafter also referred to as "gelling agent-formed gel") apart from the above-mentioned "pectin-formed agglomerated gel," yielding a gel composition in which the "pectin-formed agglomerated gel" is non-uniformly dispersed in the said gel structure phase, and that this gel composition can be used to prepare foods whose texture and taste are both especially similar to those of sarcocarp.

The present invention was developed on the basis of this knowledge, and encompasses the following aspects.

(1) Inhomogeneous Gel Composition (1-1). An inhomogeneous gel composition, which contains pectin, a divalent metal ion, and water, wherein the pectin contains at least one of pectinic acid or salt thereof, and becomes thermally stable particles with an average equivalent diameter of at least 100 μm in the presence of water (room temperature), or becomes particles having an average equivalent diameter of 10 to 5000 μm in the presence of water and calcium ions.

This inhomogeneous gel composition can also be called "an inhomogeneous gel composition, which contains pectin, a divalent metal ion, and water, wherein the pectin contains at least one of pectinic acid or salt thereof, so as to swell in the presence of water and become thermally stable particles with an average equivalent diameter of at least 100 μm, or to become particles having an average equivalent diameter of 10 to 5000 μm in the presence of water and calcium ions."

(1-2). The inhomogeneous gel composition according to (1-1), wherein at least one of calcium ion or magnesium ion is contained as the divalent metal ion.

(1-3). The inhomogeneous gel composition according to (1-1), containing pectin in a proportion of at least 0.03 wt %.

(1-4). The inhomogeneous gel composition according to (1-1), containing a divalent metal ion in a proportion of 0.1 to 40 mM.

(1-5). An non-uniform gel composition, which contains pectin, a divalent metal ion, a gelling agent, and water, wherein the pectin contains at least one of pectinic acid or salt thereof, so as to swell in the presence of water and become thermally stable particles with an average equivalent diameter of at least 100 μm, or to become particles having an average equivalent diameter of 10 to 5000 μm in the presence of water and calcium ions, and the gelling agent is negatively charged.

Note that this non-uniform gel composition can be also described as "an non-uniform gel composition comprising of pectin, a divalent metal ion, a gelling agent, and water, wherein the pectin contains at least one of pectinic acid or salt thereof and the gelling agent is negatively charged, is characterized in to become particles with an average equivalent diameter of 10 to 5000 μm in the presence of water and calcium ions, or to become thermally stable particles with an average equivalent diameter of at least 100 μm in the presence of water (room temperature)

(1-6). The non-uniform gel composition according to (1-5), wherein the negatively charged gelling agent is one that has heat resistance.

(1-7). The non-uniform gel composition according to (1-5), wherein the negatively charged gelling agent is at least one selected from the group consisting of gellan gum, alginic acid alginates, alginic esters, carrageenan, and pectin.

(1-8). The non-uniform gel composition according to (1-5), containing pectin in a proportion of at least 0.03 wt % and the divalent metal ion in a proportion of 0.1 to 40 mM (1-9). The non-uniform gel composition according to (1-5). containing the negatively charged gelling agent in a proportion of 0.005 to 5 wt %.

(1-10). The non-uniform gel composition according to (1-5), further containing at least one member of the group consisting of xanthan gum, glucomannan, and galactomannan.

(1-11). The non-uniform gel composition according to (1-5), further containing at least one of protein or acid.

(1-12). The non-uniform gel composition according to (1-11), containing protein in a proportion of 0.1 to 10 wt %.

(1-13). The non-uniform gel composition according to (1-11), wherein an acid is added so that the pH will be 2.5 to 5.

(2) Food (2-1). A food composed entirely or partially of the inhomogeneous gel composition or the non-uniform gel composition according to any of (1-1) to (1-13).

(2-2). The food according to (2-1), which is used as an imitation of a fruit (an imitation fruit).

(2-3). The food according to (2-1), which is a confection that contains the inhomogeneous gel composition or the non-uniform gel composition according to any of (1-1) to (1-13) as a fruit sarcocarp-like composition.

(2-4). The food according to (2-1), which is a jelly that contains the inhomogeneous gel composition or the non-uniform gel composition according to any of (1-1) to (1-13) as a fruit sarcocarp-like composition.

(2-5). The food according to (2-1), which is used as a beverage.

(2-6). The food according to (2-1), which is used as a food for dysphagia patients.

(2-7). The food according to (2-1), which is used as a jam, sauce, dressing, spread, filling, topping, coating, or sheet food.

(3) Method for Manufacturing an Inhomogeneous Gel Composition (3-1). A method for manufacturing the inhomogeneous gel composition according to any of (1-1) to (1-4), wherein pectin is added in solid or solution form to an aqueous solution containing a divalent metal ion, then heated and dissolved, after which this product is cooled and solidified, or pectin in solution form and a component containing a divalent metal ion are mixed, heated, and dissolved, then cooled and solidified.

(3-2). A method for manufacturing the non-uniform gel composition according to any of (1-5) to (1-13), wherein a divalent metal ion and water are mixed into a powder mixture of pectin and a gelling agent, and the components are heated and dissolved while being stirred, after which this product is cooled and solidified.

BEST MODE FOR CARRYING OUT THE INVENTION

The first present invention is an inhomogeneous gel composition prepared by using of at least pectin, a divalent metal ion, and water, as components.

This gel composition is characterized in that a divalent metal ion and pectin react in the presence of water and undergo local agglomeration and gelling, the product of which is dispersed in the form of particles in the aqueous phase, constituting an inhomogeneous (a non-uniform) phase The pectin used here contains at least one member of pectinic acid or salt thereof so as to either (1) absorb water without dissolving or gelling in the presence of water, and become particles with an average equivalent diameter of at least 100 μm, or (2) absorb water without dissolving or gelling in the presence of water and calcium ions, and become particles having an average equivalent diameter of 10 to 5000 μm. "Water" as referred to here means water that is at room temperature, or more specifically, that has a temperature of about 15 to 30° C. In the case of (1) above, the proportion in which the pectin is added with respect to the water is 0.3 wt %, and in the case of (2), the proportions in which the pectin and calcium ions are added with respect to the water are 0.3 wt % and 0.03 wt %, respectively.

The equivalent diameter distribution of the above-mentioned particles is preferably measured from a micrograph. This diameter distribution may be measured manually or with an image analysis computer. An example of magnification suited to diameter distribution measurement is from 20 to 40 times. The term "average equivalent diameter" as used in the present invention means the number weighed average equivalent diameter.

In (1) above, the average equivalent diameter of the pectin used in the present invention is usually at least 100 μm, and preferably at least 150 μm, with at least 200 μm being better yet, and at least 300 μm being particularly favorable, when swelled with water. Best of all is a pectin whose average equivalent diameter when swelled with water is at least 400 μm. More specifically, it is preferable for at least 90 wt % of the total amount of pectin, and even more preferably at least 95 wt %. to have an equivalent diameter when swelled with water of at least 200 μm, and preferably at least 300 μm, and even more preferably at least 400 μm.

In (2) above, the pectin may have an average equivalent diameter of from 10 to 5000 μm when swelled with water, with a preferable range being 150 to 450 μm, and a range of 200 to 400 μm being even better.

Examples of salts of pectinic acid include potassium salts, sodium salts, and other alkali metal salts; calcium salts, magnesium salts, and other alkaline earth metal salts; zinc salts, iron salts, manganese salts, and other transition metal salts; and aluminum salts. Just one of these pectinates may be contained, or a combination of any two types may be contained in the pectin used in the present invention. Calcium salts, magnesium salts, zinc salts, and iron salts are preferred, with calcium salts being especially favorable.

It is further preferable for the above-mentioned pectin to be heat resistant (thermally stable). "Heat resistance" as used here means that when pectin suspended in distilled water is heated, the suspended particles do not dissolve or gel. Preferably, the suspended particles will not dissolve even when heated to 120° C. This property is evaluated by suspending pectin in a proportion of 2 wt % in distilled water, gradually heating the resulting suspension (from 25° C., pH 4) to 90° C. within about 10 minutes or less, and checking whether the suspended particles can be seen with the naked eye. If they can, the pectin is deemed to be "heat resistant."

This pectin can be prepared according to the method described in Japanese Laid-Open Patent Application H7-196707. In particular, pectin containing a salt of pectinic acid can be prepared by subjecting an acid extract (pectin raw material) obtained from fruits such as citrus fruits or apples, to treatment with a so-called "cation-containing blend" that contains one or more members of metal ion that constitutes the above-mentioned metal salts of pectinic acid. This "cation-containing blend" is preferably soluble in a liquid solvent. Examples of this liquid solvent include water and a mixed solution of water and methyl alcohol, ethyl alcohol, propyl alcohol, isopropyl alcohol, or another such alcohol, acetone, ethyl acetate, or another such organic solvent that is miscible with water.

Specific examples of this cation-containing blend are those including at least calcium acetate, acidic calcium phosphate, calcium carbonate, calcium chloride, calcium citrate, calcium dihydrogenphosphate, calcium formate, calcium gluconate, calcium glutamate, calcium glycerate, calcium glycero-phosphate, calcium glycinate, calcium hydrogenphosphate, calcium hydroxide, calcium iodide, calcium lactate, calcium lactophosphate, calcium magnesium carbonate, calcium magnesium inositol hexaphosphate, tribasic calcium phosphate, calcium orthophosphate, calcium propionate, calcium pyrophosphate, calcium succinate, calcium sucrate, calcium sulfite, calcium tetraphosphate, and other such calcium salts; iron(II) acetate, iron(III) acetate, iron(III) acetate hydroxide, iron(III) ammonium chloride, iron(III) ammonium citrate, iron(II) ammonium sulfate, iron(II) carbonate, iron(II) chloride, iron(III) chloride, iron choline citrate, iron(II) citrate, iron dextran, iron(II) formate, iron (III) formate, iron(III) hypophosphite, iron(II) lactate, iron (II) acetate [sic], iron(II) phosphate, iron(III) potassium oxalate, iron(III) pyrophosphate, iron(III) sodium citrate, iron(III) sodium pyrophosphate, iron(II) sulfate, iron(III) sulfate, and other such iron salts; ammonium magnesium phosphate, ammonium magnesium sulfate, magnesium carbonate, magnesium chloride, magnesium citrate, magnesium dihydrogenphosphate, magnesium formate, magnesium hydrogenphosphate, magnesium hydrogenorthophosphate, magnesium hydroxide, magnesium hydroxide carbonate, magnesium lactate, magnesium nitrate, magnesium oxalate, magnesium oxide, magnesium phosphate, magnesium propionate, magnesium pyrophosphate, magnesium sulfate, and other such magnesium salts: and zinc acetate, ammonium zinc sulfate, zinc carbonate, zinc chloride, zinc citrate, zinc formate, zinc hydrogenphosphate, zinc hydroxide, zinc lactate, zinc nitrate, zinc oxide, zinc phosphate, monobasic zinc phosphate, tribasic zinc phosphate, zinc orthophosphate, zinc propionate, zinc pyrophosphate, zinc sulfate, zinc tartrate, zinc valerate, zinc isovalerate, and other such zinc salts. Of these, calcium chloride, calcium hydroxide, calcium acetate, calcium propionate, calcium oxide, calcium gluconate, calcium lactate, calcium carbonate, and other such calcium salts are preferred. Calcium chloride is especially favorable.

When the pectin raw material is treated using this cation-containing blend under suitable conditions (non-shear flow conditions), the pectinic acid contained in the pectin raw material forms an insoluble salt along with the cations.

The pH in the above treatment of the pectin raw material affects the ability of pectinic acid to form a salt. Accordingly, the pH is usually selected from a range of 2 to 8, with a range of 3 to 6 being preferable, and 3.2 to 4.2 being even better. The product obtained by this treatment is then dehydrated and dried, and may be pulverized as needed.

The pectin is thus prepared in a dry or semi-dry form, or in the form of a dried pulverized pectin powder, and used in the preparation of the gel composition of the present invention. The pectin used in the preparation of the gel composition of the present invention is preferably in the form of a dry powder because this makes it easier to use, and preferably the water content of this dry powder is no more than 12%. Pectin such as this is readily available commercially.

Specific examples of the divalent metal ion used in the present invention include calcium ions, magnesium ions, and other such alkaline earth metal ions. Calcium ions are preferred.

This calcium ion can be used in the form of a water-soluble calcium salt such as calcium lactate, calcium chloride, tricalcium phosphate, calcium monohydrogenphosphate, calcium dihydrogenphosphate, calcium gluconate, calcium carbonate, calcium citrate, calcium hydroxide, calcium pantothenate, calcium dihydrogenpyrophosphate, or calcium sulfate, and it can also be used in the form of cow's milk, soy milk, or another such animal or vegetable-based milk, or a milk product of these.

Although not limited to this, when cow's mik, fresh cream, or another such divalent metal ion-containing aqueous solution is used, for example, as the divalent metal ion-containing component is used, the inhomogeneous gel composition of the present invention can be prepared by adding pectin in solid form to the aqueous solution, heating (usually to between 75 and 90° C.), and stirring (usually for about 10 to 15 minutes) until the pectin dissolves, and then cooling and solidifying the solution. Meanwhile, when calcium lactate or another such divalent metal salt is used, for example, as the divalent metal ion-containing component, it is preferable to add the divalent metal salt to a pectin aqueous solution that has been prepared in advance by heating and dissolving pectin in water, and then this solution is heated and stirred as above until the divalent metal salt dissolves, and this solution is cooled and solidified to prepare the composition of the present invention.

There are no particular restrictions on the proportion in which the pectin is added here, but it is usually added such that it will be contained in an amount of at least 0.03 wt %, and preferably at least 0.06 wt %, and even more preferably at least 0.2 wt %, in the final gel composition. There are no particular restrictions on the upper limit here within this range, but 7 wt % is usual. It is preferable to select the amount from a range of 0.03 to 1 wt %.

There are no particular restrictions on the proportion in which the divalent metal ion is added, as long as it will result in agglomeration and gelling along with the pectin, but the divalent metal ion is preferably contained in an amount of 0.1 to 40 mM in the final gel composition. For instance, when a component containing calcium is used as the divalent metal ion-containing component, the preferred proportion of the component is 0.005 to 0.15 wt %, and especially when calcium lactate is used, the favorable proportion of the calcium lactate is 0.06 to 0.7 wt %.

The inhomogeneous gel composition of the present invention obtained in this manner consists of a gel agglomerate, formed from pectin and a divalent metal ion, dispersed in particle form in an aqueous system. Because an elasticity of the gel agglomerate, the inhomogeneous gel composition has a sarcocarp-like texture that feels fibrous.

Consequently, with the inhomogeneous gel composition of the present invention, if the desired colorings and flavorings are further added, it is possible to produce a food that has a texture and taste similar to those of fruit sarcocarp. In specific terms, the inhomogeneous gel composition of the present invention can be used to prepare foods having the above-mentioned texture (sarcocarp-like texture) similar to that of fruit sarcocarp, and particularly dessert foods such as jellies, by adding a powder mixture including pectin, sugar, and so forth to a divalent metal ion-containing component prepared by diluting cow's milk, fresh cream, or another such milk product with water as needed, stirring and dissolving while heating the mixture for about 10 to 15 minutes at approximately 75 to 90° C., and then adding and dissolving an acid, fruit juice, or other preparation for controlling flavor and, if needed, another divalent metal ion (a calcium salt such as calcium lactate, etc.), and any flavorings, colorings, or the like, adjusting the total weight, packing the product into a container, and cooling. Regarding this cooling, the product usually solidifies when allowed to stand for several hours at room temperature (about 25° C.) or lower, but water cooling (at about 5 to 10° C.) is preferred because it shortens the cooling time.

As described above, when a solid milk product such as nonfat powdered milk is used as the divalent metal ion-containing component, it is preferable for the mixture containing pectin, sugar, and so forth to be heated and dissolved in water ahead of time, and for the above-mentioned divalent metal ion-containing component to be added to this pectin solution.

Secondly, the present invention is a non-uniform gel composition prepared by using a negatively charged gelling agent in addition to the above-mentioned components, namely, pectin, a divalent metal ion, and water. This gel composition is characterized in that an agglomerated gel (pectin-formed agglomerated gel) formed from a divalent metal ion and pectin is dispersed in a gel structure phase (gelling agent-formed gel) formed by the above-mentioned divalent metal ion and the gelling agent, creating a non-uniform phase.

There are no particular restrictions on the gelling agent used here as long as it is a gelling agent used in foods and that has a negative charge, but specific examples include gellan gum, alginic acid etc. (alginic acid, sodium alginate and other such alginates, and alginic acid propylene glycol ester and other such esters of alginic acid), carrageenan (ι-carrageenan, κ-carrageenan), and pectin (LM pectin, HM pectin). These may be used singly or in any combination of two or more members.

Also, xanthan gum, mannans (such as locust bean gum, tara gum, guar gum, or another such galactomannan, or a glucomannan such as konjac powder), or the like can be used in combination for the gelling agent in order to vary the characteristics of the gel. For instance, when gellan gum and carrageenan are used together as the negatively charged gelling agent, combining them with the above-mentioned mannans allows the elasticity of the gel to be increased. The use of mannans in combination with gellan gum and/or carrageenan is particularly favorable.

A heat resistant gelling agent is preferable, examples of which include gellan gum, alginic acid etc., and LM pectin. Of these, gellan gum is especially good. This gellan gum is not only useful in preparing a moist gel composition that is close to fruit sarcocarp, but also is suitable for pectin, and binds extremely well with pectin, particularly when the pectin has been swelled with water. Accordingly, the non-uniform gel composition of the present invention can be prepared in a form in which an agglomerated gel (pectin-formed agglomerated gel) formed from pectin and a divalent metal ion is integrally bonded in a gel structure (gelling agent-formed gel) phase formed from a gelling agent and a divalent metal ion. Thus, there is no unnatural separation of this non-uniform gel composition when it is put in the mouth, giving it a better sarcocarp-like texture.

The proportion in which the above-mentioned gelling agent is contained in the non-uniform gel composition of the present invention will vary with the type of gelling agent being used, the intended use of the gel composition being prepared (the type of fruit to be imitated), and other such factors, and therefore cannot be specified unconditionally, but it usually can be suitably adjusted within a range of 0.005 to 5 wt %, and preferably 0.01 to 3 wt %, per 100 wt % of the final gel composition. More specifically, when gellan gum is used as the gelling agent, for example, it is usually contained in an amount of 0.06 to 1.2 wt %, and preferably 0.12 to 0.6 wt %, and even more preferably 0.18 to 0.45 wt %, per 100 wt % of the final gel composition; when carrageenan is used, it is usually contained in an amount of 0.02 to 0.4 wt %, and preferably 0.04 to 0.2 wt %, and even more preferably 0.06 to 0.15 wt %, per 100 wt % of the final gel composition. When glucomannan is used along with the gelling agent, it usually should be contained in a proportion of 0.02 to 0.4 wt %, and preferably 0.04 to 0.2 wt %, and even more preferably 0.06 to 0.15 wt %.

In addition to the pectin, a divalent metal ion, and a gelling agent discussed above, the non-uniform gel composition of the present invention can also contain one or more members of protein or acid.

A protein will react with both the pectin and the gelling agent. Accordingly, adding a protein makes it possible to adjust as desired the elasticity of both the pectin-formed agglomerated gel formed from pectin and a divalent metal ion and the gelling agent-formed gel formed from a gelling agent and a divalent metal ion, and also increases the bond between the pectin-formed agglomerated gel and the gelling agent-formed gel, which makes the two gels feel even more solidly integrated.

There are no particular restrictions on the protein used in the present invention, as long as it is a protein commonly used in foods, but examples include milk protein, egg whites, meat and fish protein, and various other animal-derived proteins, and wheat protein, soy protein, and various other vegetable-derived proteins.

If a protein is added, the proportion in which it is added will vary with the type of gelling agent being used, the intended use of the gel composition being prepared (the type of fruit to be imitated), and other such factors, and therefore cannot be specified unconditionally, but it usually can be selected so that the protein is contained in a proportion of about 0.1 to 10 wt % per 100 wt % of the final gel composition.

There are no particular restrictions on the acid used in the present invention, as long as it is an acid component commonly used in foods, but examples include citric acid, lactic acid, malic acid, succinic acid, tartaric acid, adipic acid, acetic acid, glacial acetic acid, fumaric acid. glucono-delta-lactone, gluconic acid, butyric acid, and various other organic acids; and phosphoric acid, carbonic acid, hydrochloric acid, and other such inorganic acids. These acids may be acids originating in fruit juice, or fruit juice itself may be used.

The acid is useful as a regulator for controlling a sarcocarp-like texture of the non-uniform gel composition of the present invention, and its addition will also have a taste effect, such as improving the flavor.

If an acid is added, there are no particular restrictions on the proportion in which it is contained, but the amount usually should be suitably adjusted so that the final pH of the non-uniform gel composition of the present invention will be about 2.5 to 5, and preferably about 3.2 to 4.2.

Although not limited to this, when cow's milk, fresh cream, or another such divalent metal ion-containing aqueous solution is used, for example, as the divalent metal ion-containing component, this non-uniform gel composition of the present invention can be prepared by adding pectin and a gelling agent in solid form to this aqueous solution, heating (usually to about 75 to 90° C.), and stirring (usually for about 10 to 15 minutes) until the pectin and the gelling agent dissolve, and then cooling and solidifying the solution. Meanwhile, when the divalent metal salts such as calcium lactate, nonfat powdered milk or another such solid-form divalent metal ion-containing component is used, for example, as the divalent metal ion-containing component, it is preferable to add the said solid-form component to an aqueous solution,on containing pectin and a gelling agent that has been prepared in advance by heating and dissolving pectin and the gelling agent in water, and then this solution is heated and stirred as above until the solid-form component dissolve, and this solution is cooled and solidified to prepare the non-uniform gel composition of the present invention.

The non-uniform gel composition of the present invention thus obtained consists of a gel agglomeration (pectin-formed agglomerated gel) formed from pectin and a divalent metal ion, and a gel structure phase (gelling agent-formed gel) formed from a gelling agent and a divalent metal ion, wherein the pectin-formed agglomerated gel in the form of particles is non-uniformly dispersed in, and adhere to the gelling agent-formed gel. The non-uniform gel composition has a sarcocarp-like texture constituted by the gelling agent-formed gel and the pectin-formed agglomerated gel, and also has a taste (mouth feelings) similar to that of fruit sarcocarp due to the elasticity of these gels.

Consequently, with the non-uniform gel composition of the present invention, if the desired colorings and flavorings are further added, it is possible to produce a food that has a sarcocarp-like texture, taste (mouth feelings), and flavor. In specific terms, the non-uniform gel composition of the present invention can be used to prepare foods having the above-mentioned sarcocarp-like texture, and particularly dessert foods such as jellies, by adding a powder mixture including pectin, a gelling agent, sugar, and so forth to a divalent metal ion-containing component prepared by diluting cow's milk, fresh cream, or another such milk product with water as needed, stirring and dissolving while heating the mixture for about 10 minutes at approximately 80° C., and then adding and dissolving an acid, fruit juice, or other preparation for controlling flavor and, if needed, a protein, another divalent metal ion (a calcium salt such as calcium lactate, etc.), and any flavorings, colorings, or the like, adjusting the total weight, packing the product into a container, and cooling. This cooling can usually be accomplished at room temperature (25° C.) or with water cooling (8° C.), and the product will solidify in just a few hours. If a solid such as nonfat powdered milk or calcium lactate is used as the divalent metal ion-containing component, it is preferable for the mixture containing pectin, the gelling agent, sugar, and so forth to be heated and dissolved in water ahead of time, and for the above-mentioned solid-formed divalent metal ion-containing component to be added to this pectin and gelling agent-containing solution.

The present invention also provides a food made up of the above-mentioned an inhomogeneous gel composition or a non-uniform gel composition, or a food that partially contains any of these gel compositions. This food can be composed entirely or partially of an inhomogeneous gel composition or a non-uniform gel composition, as a sarcocarp-like composition (imitation fruit), for instance, examples of which include jelly, yogurt, Bavarian cream, fruit packed in syrup, pudding and other confections, jam, marmalade, and flower paste and other fillings. The food of the present invention also includes the above-mentioned confections and fillings that contain a piece of a real fruit (sarcocarp) in the above-mentioned inhomogeneous gel composition or non-uniform gel composition.

Specific examples of such foods include the following.

1. Sarcocarp-like Composition (Imitation Fruit)

Examples include imitation fruits that simulate the sarcocarp-like texture and/or taste (mouth feelings) of melon, apple, pear, and orange and other such citrus fruits, strawberry, watermelon, peach, grape, kiwi fruit, mango, chestnut, and various other types of fruit. Heat sterilization of this product will not destroy the gel structure, so the product can be stored for an extended period while retaining its initial sarcocarp-like texture and/or taste, and such an imitation fruit has commercial value.

2. Jelly Containing a Sarcocarp-like Composition (Imitation Fruit)

This is a jelly produced by adding the above-mentioned sarcocarp-like composition as an imitation fruit into a jelly, entirely or partially replacing real fruit sarcocarp. The jelly portion can be prepared to be either an acidic or a neutral type. This jelly containing a sarcocarp-like composition can be easily prepared by a standard method, by filling a container with the gel composition of the present invention along with the jelly portion and then cooling. Also, since the sarcocarp-like composition composed of the gel composition can be heated without the gel falling apart, this jelly can be heat sterilized without the sarcocarp-like composition becoming mixed with the jelly portion. Accordingly, this can be provided as a sarcocarp-like jelly instant premix (retort pouch product).

3. Food for Dysphagia Patients, or Drinkable Jelly

If the gel strength of the gel composition of the present invention adjusted low enough, this composition can be prepared as a food that can be consumed directly or through a straw.

4. Jam-like Food, Fruit Sauce, Fruit Dressing, Spread Food (Flower Paste, Fruit-spread), Filling, Topping, Sheet-formed Food If the gel strength of the gel composition of the present invention adjusted low enough to produce a sol, the composition can be a food in the form of a jam, sauce, or spread. These can be put between slices of bread to make a jam sandwich, or can be used as a topping for pizza or pie, or can be injected inside sweet bread to make a filled pastry. Furthermore, if this sauce (such as blueberry sauce) is kneaded into the dough when muffins or the like are baked, for example blueberry muffins can be made. This food product can also be packaged in a container such as a mayonnaise tube.

5. Applications to Formed-foods Such as Kamaboko (Re-structured Food), Ham, Sausage, and Hamburger Patties The gel composition and gelled food of the present invention is heat resistant, retaining its shape when heated, and is therefore also effective at maintaining the shape of these foods while preserving their unique texture.

6. Use as a Coating

The gel composition of the present invention can be used as a coating with a sarcocarp-like texture to various types of food. For instance, this coating can be applied to ice candy, resulting in ice candy that has a fruit-like texture.

7. Applications to Viscous Beverages Such as Nectar and Smoothies

A viscous beverage, and particularly a viscous beverage having a sarcocarp-like texture, can be provided by using of the gel composition of the present invention adjusted to the viscosity of a sol.

8. Jelly in a Pouch

With conventional jellies in a pouch, it was impossible to add a large solid such as sarcocarp because of the need to fill the pouch with the jelly liquid through its opening during manufacture, and furthermore a jelly entirely in a sarcocarp-like state could not be sealed in a pouch. With the present invention, regardless of the size of the fill opening of the container (pouch, bottle, etc.), it is still possible for the entire contents of the container to be prepared as a sarcocarp-like composition (imitation fruit), or to prepare a jelly containing a sarcocarp-like composition (imitation fruit) that is larger than the fill opening as part of the contents. Thus, the present invention provides a food (jelly, imitation fruit, fruit-containing jelly, etc.) that can be eaten in a new way. For instance, the gel composition of the present invention can be put into a stand-up pouch (a slender, rectangular, stick-type pouch) so that the food can be bitten off a little at a time directly from the container, without using a fork or other utensil and without dirtying the hands.

EXAMPLES

The present invention will now be described in further detail through the following examples, but is not limited in any way to or by these examples. All "parts" in the present invention refer to weight parts unless otherwise specified. The asterisks (*) in the following formulations indicate a product of San-Ei Gen F.F.I., INC. The pectin used in these examples contains at least one of pectinic acid or salt thereof, and becomes thermally stable particles with an average equivalent diameter of at least 100 μm in the presence of water (room temperature).

Example 1

Strawberry Sauce (for Yogurt Topping)

| | |
|---|---|
| sugar | 30.0 parts |
| fivefold-concentrated strawberry juice | 5.0 |
| pectin | 0.6 |
| calcium lactate | 0.2 |
| citric acid (crystals) (50% aqueous solution) | 0.3 |
| flavoring (trade name: Strawberry Flavor No. 59553) | 0.2 |
| water | balance |
| total | 100.0 parts |

A powder mixture of sugar and pectin prepared in advance was added to water and then heated and dissolved while being stirred for 10 minutes at 80° C. The fivefold-concentrated strawberry juice, the citric acid, the calcium lactate dissolved in a small amount of warm water, and the flavoring were added to the above and dissolved under stirring. The total amount was then adjusted with water, and the product was cooled to prepare a strawberry sauce (used as a yogurt topping). The strawberry sauce thus obtained had a grainy, fibrous texture, just like a sauce containing real strawberry fruit, and when it was used to top yogurt, the result was a fruit yogurt indistinguishable from one containing strawberry fruit.

Example 2

Sarcocarp-like Composition (Imitation Melon)

| | |
|---|---|
| sugar | 10.00 parts |
| pectin | 0.09 |
| gellan gum | 0.18 |
| calcium lactate | 0.20 |
| κ-carrageenan | 0.06 |
| mannan | 0.06 |
| fresh cream | 2.00 |
| coloring (trade name: Paprika Base 70R*) | 0.10 |
| flavoring (trade name: Melon Flavor No. 60245) | 0.20 |
| water | balance |
| total | 100.00 parts |

A powder mixture of sugar, pectin, gellan gum, κ-carrageenan, and mannan prepared in advance was added to a mixture of water and fresh cream and then heated and dissolved while being stirred for 10 minutes at 80° C. The coloring, flavoring, and the calcium lactate dissolved in a small amount of warm water were added to the above and dissolved under stirring. The total amount was then adjusted with water, and the product was put into a container. The contents were cooled and solidified to prepare a sarcocarp-like composition (imitation melon). The sarcocarp-like composition thus obtained had a grainy, fibrous texture, just like real melon flesh.

Example 3

Sarcocarp-like Composition (Imitation Pear)

| | |
|---|---|
| sugar | 15.0 parts |
| pectin | 0.3 |
| gellan gum | 0.3 |
| sixfold-concentrated pear juice | 2.0 |
| calcium lactate | 0.2 |
| trisodium citrate | 0.05 |
| κ-carrageenan | 0.05 |
| glucomannan | 0.05 |
| fresh cream | 2.0 |
| citric acid | 0.15 |
| flavoring (trade name: Pear Flavor No. 61932*) | 0.2 |
| water | balance |
| total | 100.00 parts |

A powder mixture of sugar, pectin, gellan gum, κ-carrageenan, glucomannan, and trisodium citrate prepared in advance was added to a mixture of water and fresh cream and then heated and dissolved while being stirred for 10 minutes at 80° C. The citric acid, the sixfold-concentrated pear juice, and the calcium lactate dissolved in a small amount of warm water were added to the above and dissolved under stirring. The coloring and flavoring were added to the above, the total amount was adjusted with water, and the product was put into a container. The contents were cooled and solidified to prepare a sarcocarp-like composition (imitation pear). The sarcocarp-like composition thus obtained had a grainy, fibrous texture, just like real pear flesh.

Example 4

Sarcocarp-like Composition (Imitation Apple)

| | |
|---|---|
| sugar | 15.0 parts |
| pectin | 0.3 |
| gellan gum | 0.4 |
| puréed apple | 5.0 |
| fivefold-concentrated clear apple juice | 2.0 |
| calcium lactate | 0.2 |
| trisodium citrate | 0.05 |
| κ-carrageenan | 0.1 |
| glucomannan | 0.1 |
| fresh cream | 2.0 |
| citric acid | 0.2 |
| flavoring (trade name: Apple Essence No. 52747*) | 0.15 |
| coloring (trade name: Sun Yellow No. 2*) | 0.02 |
| water | balance |
| total | 100.00 parts |

A powder mixture of sugar, pectin, gellan gum, κ-carrageenan, glucomannan, and trisodium citrate prepared in advance was added to a mixture of water and fresh cream and then heated and dissolved while being stirred for 10 minutes at 80° C. The citric acid, the puréed apple, the fivefold-concentrated apple juice, and the calcium lactate dissolved in a small amount of warm water were added to the above and dissolved under stirring. The coloring and flavoring were added to the above, the total amount was adjusted with water, and the product was put into a container. The contents were cooled and solidified to prepare a sarcocarp-like composition (imitation apple). The sarcocarp-like composition thus obtained had a grainy, fibrous texture, just like real apple flesh.

Example 5

Sarcocarp-like Composition (Imitation Banana)

| | |
|---|---|
| sugar | 15.0 parts |
| pectin | 0.3 |
| gellan gum | 0.2 |
| puréed banana | 5.0 |
| calcium lactate | 0.2 |
| trisodium citrate | 0.05 |
| κ-carrageenan | 0.1 |
| cornstarch | 1.5 |
| glucomannan | 0.15 |
| fresh cream | 5.0 |
| citric acid | 0.2 |
| flavoring (trade name: Banana Flavor No. 61447*) | 0.15 |
| coloring (trade name: Sun Yellow No. 2*) | 0.02 |
| water | balance |
| total | 100.00 parts |

A powder mixture of sugar, pectin, gellan gum, ι-carrageenan, glucomannan, trisodium citrate, and cornstarch prepared in advance was added to a mixture of water and fresh cream and then heated and dissolved while being stirred for 10 minutes at 80° C. The citric acid, the puréed banana, and the calcium lactate dissolved in a small amount of warm water were added to the above and dissolved under stirring. The coloring and flavoring were added to the above, the total amount was adjusted with water, and the product was put into a container. The contents were cooled and solidified to prepare a sarcocarp-like composition (imitation banana). The sarcocarp-like composition thus obtained had a grainy, fibrous texture, just like real banana flesh.

Example 6

Sarcocarp-like Composition (Imitation Chestnut)

| | |
|---|---|
| sugar | 15.0 parts |
| pectin | 0.3 |
| gellan gum | 0.6 |
| marron paste | 15.0 |
| calcium lactate | 0.2 |
| trisodium citrate | 0.05 |
| κ-carrageenan | 0.2 |
| glucomannan | 0.15 |
| flavoring (trade name: Marron Flavor No. 69*) | 0.15 |
| coloring (track name: Carrot Base 160R*) | 0.02 |
| water | balance |
| total | 100.00 parts |

A powder mixture of sugar, pectin, gellan gum, κ-carrageenan, glucomannan, and trisodium citrate prepared in advance was added to a mixture of water and fresh cream and then heated and dissolved while being stirred for 10 minutes at 80° C. The marron paste and the calcium lactate dissolved in a small amount of warm water were added to the above and dissolved under stirring. The coloring and flavoring were added to the above, the total amount was adjusted with water, and the product was put into a container. The contents were cooled and solidified to prepare a sarcocarp-like composition (imitation chestnut). The sarcocarp-like composition thus obtained had a grainy, fibrous texture, just like real chestnut.

Example 7

Sarcocarp-like Composition (Imitation Watermelon)

| | |
|---|---|
| sugar | 15.0 parts |
| pectin | 0.3 |
| gellan gum | 0.2 |
| calcium lactate | 0.2 |
| trisodium citrate | 0.05 |
| κ-carrageenan | 0.1 |
| glucomannan | 0.1 |
| nonfat powdered milk | 0.6 |
| flavoring (trade name: Watermelon Flavor No. 61043*) | 0.15 |
| coloring (trade name: Sun Red RC*) | 0.1 |
| water | balance |
| total | 100.00 parts |

A powder mixture of sugar, pectin, gellan gum, κ-carrageenan, glucomannan, trisodium citrate, and nonfat powdered milk prepared in advance was added to water and then heated and dissolved while being stirred for 10 minutes at 80° C. The calcium lactate dissolved in a small amount of warm water was added to the above and dissolved under stirring. The coloring and flavoring were added to the above, the total amount was adjusted with water, and the product was put into a container. The contents were cooled and solidified to prepare a sarcocarp-like composition (imitation watermelon). The sarcocarp-like composition thus obtained had a grainy, fibrous texture, just like real watermelon.

Example 8

Sarcocarp-like Jelly Immersed in Syrup

Each of the sarcocarp-like compositions from Examples 2 to 7 above was cut with a spoon into bite-size cubes measuring 15 mm at a side, these were immersed in syrup (pH 3.8) comprising 15% sugar, 0.1% trisodium citrate, and 0.2% citric acid, and then heat sterilized for 20 minutes at 90° C., after which this product was cooled to prepare a sarcocarp-like jelly immersed in syrup. These sarcocarp-like jellies (sarcocarp-like compositions) had the same texture as before being sterilized, and the gel composition did not lose its nature as a result of the heat sterilization.

Example 9

Preparation of Fruit-containing Jelly

Each of the sarcocarp-like compositions from Examples 2 to 7 above was cut with a spoon into bite-size cubes measuring 15 mm at a side. Meanwhile, the various components listed below were blended and then heated and dissolved for 10 minutes at 80° C. to prepare a jelly solution (pH 3.9) as the jelly portion. A container was filled with the above-mentioned cut sarcocarp-like composition and this jelly solution so that the weight ratio was 1:1, and the contents were heat sterilized for 20 minutes at 90° C. to obtain a fruit-containing jelly (imitation fruit-containing jelly).

Jelly Ingredients

| | |
|---|---|
| sugar | 18.0 parts |
| carrageenan | 0.4 |
| locust bean gum | 0.2 |
| gellan gum | 0.1 |
| calcium chloride | 0.1 |
| citric acid | 0.2 |
| sodium citrate | 0.1 |
| water | balance |
| total | 100.0 parts |

As a comparative example, a fruit-containing jelly was prepared by the same method as above, except that real fruit sarcocarp was used instead of the sarcocarp-like compositions of Examples 2 to 7. With the comparative example, there was an unpleasant odor, a softening of the fruit sarcocarp, and a deterioration of the color, all thought to be attributable to the heat sterilization, but none of these happened with the fruit jellies of the present invention, which had a good appearance and were moist and delicious jellies.

Example 10

Imitation Sarcocarp in a Pouch

Unsolidified solutions before cooling of the imitation melon of Example 2, the imitation pear of Example 3, and the imitation watermelon of Example 7 were each put into a pouch or a plastic juice container and heat sterilized for 20 minutes at 90° C., then cooled to obtain an imitation sarcocarp in a pouch (or a plastic container).

INDUSTRIAL APPLICABILITY

The inhomogeneous gel composition and non-uniform gel composition of the present invention make it possible to provide a food having a texture or taste (mouth feelings) similar to that of fruit sarcocarp. In particular, with the second non-uniform gel composition prepared using both pectin and a negatively charged gelling agent, the sarcocarp-like texture and taste are closer to those of real fruit than with various the sarcocarp-like texture gel compositions proposed in the past. Thus, with the gel compositions of the present invention, imitation fruit, sarcocarp-like texture confections, and so forth can be provided. Also, because the gel compositions of the present invention have excellent heat resistance, it do not lose its shape or the desired sarcocarp-like texture in the heat sterilization process during its preparation, and because of those excellent freezing and thawing resistance, there is little water separation caused by freezing and thawing, so these compositions can be applied to a wide variety of foods without being limited to any particular manufacturing process or merchandise form such as refrigerated or frozen, which afford greater diversity in food. Also, because they can be heat sterilized without losing its shape or texture, as mentioned above, the gel compositions of the present invention is useful as a food that can be stored at room temperature for an extended period.

Finally, if its gel strength is adjusted low enough, the gel composition of the present invention will also be useful in that it can be applied to foods for dysphagia patients.

The invention claimed is:

1. A non-uniform gel composition comprising a thermally stable pectin, a divalent metal ion, a negatively charged gelling agent, and water,
   wherein a gel agglomerate forms as a result of reaction between the divalent metal ion and the pectin in the presence of water, said gel agglomerate being non-uniformly dispersed in a gel structure phase formed from the divalent metal ion and the negatively charged gelling agent, and
   wherein the pectin contains at least one of pectinic acid or salt thereof, so as to swell in the presence of water without calcium ion and become particles with an average equivalent diameter of at least 100 µm.

2. The non-uniform gel composition according to claim 1, wherein the negatively charged gelling agent has heat resistance.

3. The non-uniform gel composition according to claim 1, wherein at least one member selected from the group consisting of gellan gum, alginic acid, alginates, alginic esters, carrageenan, and pectin is used as the negatively charged gelling agent.

4. The non-uniform gel composition according to claim 1, containing the pectin in a proportion of at least 0.03 wt % and the divalent metal ion in concentration of 0.1 to 40 mM.

5. The non-uniform gel composition according to claim 1, containing the negatively charged gelling agent in a proportion of 0.005 to 5 wt %.

6. The non-uniform gel composition according to claim 1, further containing at least one member selected from the group consisting of xanthan gum, glucomannan, and galactomannan.

7. The non-uniform gel composition according to claim 1, further containing at least one of protein or acid.

8. The non-uniform gel composition according to claim 7, containing the protein in a proportion of 0.1 to 10 wt %.

9. The non-uniform gel composition according to claim 7, wherein the acid is added so that the pH will be 2.5 to 5.

10. A food composed entirely or partially of the non-uniform gel composition of claim 1.

11. The food according to claim 10, which is used as an imitation fruit.

12. The food according to claim 10, which is a food for dysphagia patients.

13. A confection comprising the non-uniform gel composition of claim 1 as a fruit sarcocarp-like composition.

14. A jelly comprising or the non-uniform gel composition of claim 1 as a fruit sarcocarp-like composition.

15. A method for manufacturing the non-uniform gel composition according to claim 1, comprising mixing a divalent metal ion and water into a powder mixture of pectinic acid or salt thereof and a negatively charged gelling agent, heating and dissolving the resulting mixture and then while stirring, cooling and solidifying said mixture.

* * * * *